United States Patent
Beck et al.

(10) Patent No.: US 7,599,366 B2
(45) Date of Patent: Oct. 6, 2009

(54) FLOW-AWARE ETHERNET DIGITAL SUBSCRIBER LINE ACCESS MULTIPLEXER DSLAM

(75) Inventors: Michaël Andries Thomas Beck, Merksem (BE); Eric Frans Elisa Borghs, Geel (BE); Paul Henri Marie Cautereels, Hingene (BE); Hans Maurice Felix Corneel Dequeker, Herent (BE); Tim Gyselings, Deurne (BE)

(73) Assignee: Alcatel, Paris (FR)

( * ) Notice: Subject to any disclaimer, the term of this patent is extended or adjusted under 35 U.S.C. 154(b) by 552 days.

(21) Appl. No.: 11/265,247

(22) Filed: Nov. 3, 2005

(65) Prior Publication Data
US 2006/0114896 A1 Jun. 1, 2006

(30) Foreign Application Priority Data
Nov. 30, 2004 (EP) .................. 04292820

(51) Int. Cl.
*H04L 12/56* (2006.01)
(52) U.S. Cl. .................... 370/389; 370/352; 370/395.43
(58) Field of Classification Search ........................ None
See application file for complete search history.

(56) References Cited

U.S. PATENT DOCUMENTS

| | | | |
|---|---|---|---|
| 6,424,657 B1 | 7/2002 | Voit et al. | |
| 7,023,856 B1* | 4/2006 | Washabaugh et al. | .... 370/395.1 |
| 7,113,479 B2* | 9/2006 | Wong | .......................... 370/235 |
| 2002/0009076 A1* | 1/2002 | Engbersen et al. | .......... 370/389 |
| 2002/0091495 A1* | 7/2002 | Woodroffe | .................... 702/122 |
| 2003/0023846 A1* | 1/2003 | Krishna et al. | ............... 713/162 |
| 2003/0123452 A1* | 7/2003 | Cox et al. | .............. 370/395.43 |
| 2006/0013210 A1* | 1/2006 | Bordogna et al. | ........... 370/389 |

FOREIGN PATENT DOCUMENTS

| | | |
|---|---|---|
| EP | 1 073 251 A | 1/2001 |
| EP | 1 453 260 A | 9/2004 |
| WO | WO 2004/080024 A | 9/2004 |

* cited by examiner

Primary Examiner—Hong Cho
Assistant Examiner—Robert C Scheibel
(74) Attorney, Agent, or Firm—Sughrue Mion, PLLC

(57) ABSTRACT

An access node (1) that is preferably a Flow-Aware Ethernet DSLAM configured to transmit Ethernet data frames between subscribers (2) and an aggregation network (3). The access node comprises a first memory (4) for storing classification rules and a second memory (6) for storing flow rules. These rules are applied by a classification agent (5) and by a service agent (7) to information extracted from incoming data frames in order to infer flow awareness information of outgoing frames corresponding to these incoming data frame. In this way, the subscriber access network evolves to a multi-service architecture by replacing ATM with Ethernet for cost reasons. The concept of "flow awareness" is applied to the present access node. With respect to known tunnel-based Ethernet DSLAMs, the present access node removes all dependency on correct encapsulation or labeling at the customer side and at the service provider side.

8 Claims, 1 Drawing Sheet

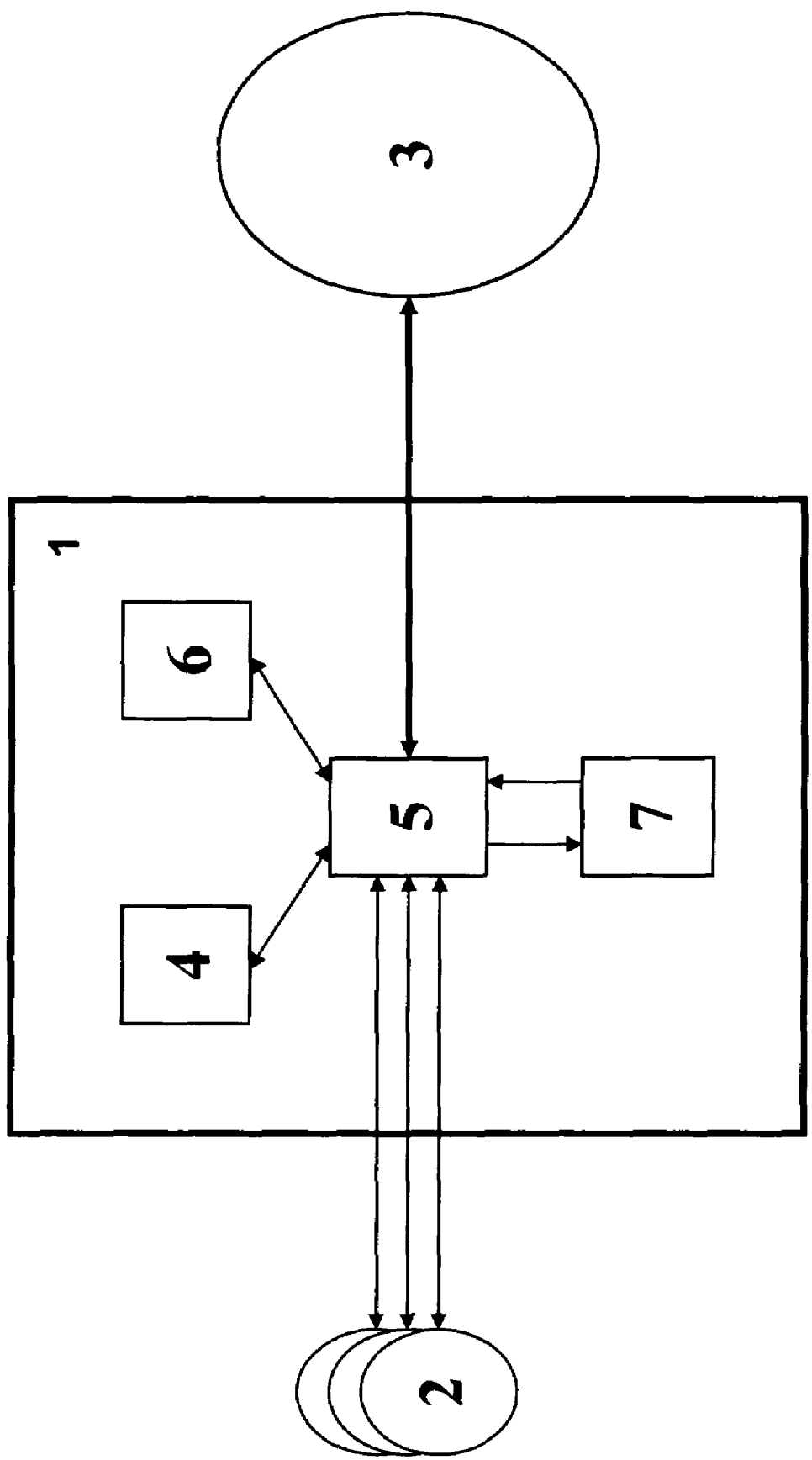
Figure

FLOW-AWARE ETHERNET DIGITAL SUBSCRIBER LINE ACCESS MULTIPLEXER DSLAM

The present invention relates to an access node adapted to transmit Ethernet data frames between a plurality of subscribers and an aggregation network.

BACKGROUND OF THE INVENTION

Such an access node is generally known in the art. It is for instance a well-known Digital Subscriber Line Access Multiplexer DSLAM.

Subscriber access networks comprising an access node are evolving to a multi-service architecture, while trying to replace Asynchronous Transfer Mode ATM with Ethernet for cost reasons. To support a multi-service architecture, ATM-like features must be added to Ethernet, such as "flow awareness". This is the ability to treat traffic differently depending on the subscriber to whom it belongs, and the type of service it represents.

To date, Quality-of-Service QoS, policing and forwarding decisions are made in the access node by means of tunnel-based protocols, such as ATM, Point-to-Point Protocol over ATM PPPoA, and Point-to-Point Protocol over Ethernet PPPoE, or Differentiated Services DiffServ labeling techniques.

The mechanism relies on correct encapsulation or labeling at the customer side and at the service provider side. There is no possibility to insert traffic into a tunnel at an intermediate point, as may be required for multicast. There is no possibility to dynamically increase or decrease the number of quality-of-service levels at an intermediate point.

Furthermore, the known access nodes always operate at a single layer of the network for all traffic: either layer 2 (Ethernet switch) or layer 3 (Internet Protocol IP router).

An object of the present invention is to introduce the concept of "flow awareness", well known in the field of ATM and IP, to an access node, as for instance an Ethernet DSLAM.

SUMMARY OF THE INVENTION

According to the invention, this object is achieved due to the fact that said access node comprises a memory adapted to store classification rules applicable to said data frames, and that said access node further comprises a classification agent coupled to said memory and adapted to extract source information from an incoming data frame, and to apply said classification rules onto said extracted source information in order to infer flow awareness information of an outgoing frame corresponding to said incoming data frame.

In this way, the concept of "flow awareness" may be applied to the present access node, a flow being a set of data frames characterized by any specific combination of fields up to layer 3 of the protocol stack. With respect to tunnel-based Ethernet DSLAMs, the present access node removes all dependency on correct encapsulation or labeling at the customer side and at the service provider side. By removing the need for tunnels, traffic may now be inserted at any intermediate point, as may be required for multicast.

In a preferred characterizing embodiment of the present invention, said access node is an Ethernet Digital Subscriber Line Access Multiplexer.

In other words, the present access node is a Flow-Aware Ethernet DSLAM that combines the advantages both of the Ethernet DSLAM and of the flow concept. This combination is a necessary step towards the evolution to an Ethernet-based access and aggregation network. A flow-aware Ethernet DSLAM would thus provide the benefits of an Ethernet DSLAM (low cost, packet-based switching) with the Quality-of-Service and policing capabilities of a tunnel-based DSLAM.

Another characterizing embodiment of the present invention is that said classification agent is adapted to apply said classification rules onto first source information extracted from at least one first incoming data frame of a flow, and to calculate frame signatures from second source information extracted from the following data frame of said flow.

Implementing the flow concept in a large access multiplexer, e.g. a fiber aggregator, involves a significant amount of processing power, given the huge amounts of data traveling through the box. To facilitate the implementation, the concept of "stateful flow awareness" is introduced by the invention: only the first frame(s) of a flow, i.e. the pilot frames, need(s) to be inspected in detail in order to make a global policing, classification, and forwarding decision for the entire flow, based on a set of formal rules. Later frames belonging to the same flow, recognized by a "signature", are treated according to the decision established for the pilot frames. Metering may be implemented on a per-flow basis.

Also another characterizing embodiment of the present invention is that said source information consists in one or more of a source Media Access Control MAC address, a destination Media Access Control MAC address, a Virtual Local Area Network Identification Number VLAN ID, a user-priority field, a source Internet Protocol IP address, a destination IP address, and a Type Of Service TOS field.

Physical port, logical port (if applicable), source and/or destination MAC address, VLAN id, 802.1 p bits, source and/or destination IP address, TOS bits are all fields of the protocol stack up to layer 3. In other words, the decision to forward a flow to a particular outbound port may be based among other criteria on its destination MAC address (Ethernet bridging), the VLAN identifier and destination MAC address (VLAN bridging), or the destination IP address (basic IP router function).

Yet another characterizing embodiment of the present invention is that said access node further comprises a service agent coupled to said classification agent and adapted to extract additional information from said incoming data frames, and that said service agent is adapted to apply said classification rules to a combination of said source information and said additional information in order to infer flow awareness information of an outgoing frame corresponding to said incoming data frame.

Additionally or alternatively to the above described embodiment, the flow may be committed to a "service blade" or an internal agent that is capable of treating the individual frames of the flow with regard to higher-layer content information.

Again another characterizing embodiment of the present invention is that said additional information consists in one or more of an Internet Protocol IP field, a source Transmission Control Protocol TCP port, a destination TCP port, a source User Datagram Protocol UDP port, and a destination UDP port.

This further granularity is obtained by looking at fields from layer 4 of the protocol stacks up.

The present invention is further characterized in that said flow awareness information consists in one or more of outbound port identity, format, header fields, priority, and drop precedence of an outgoing frame corresponding to said incoming data frame.

The information obtained by identifying the flow to which certain traffic belongs can thus be used inter-alia to make a forwarding decision (outbound port selection), to rebuild the frame structure (protocol translation), or to set the quality of service parameters of the outgoing frame.

Still another characterizing embodiment of the present invention is that said access node further comprises a service agent coupled to said classification agent and adapted to apply cryptographic transformations to at least parts of said incoming data frames.

Flow awareness allows a dynamic increase or decrease of the number of quality-of-service levels at the flow-aware Ethernet DSLAM. Another advantage is the possibility to apply additional processing to certain flows, including network address translation and encryption. Further characterizing embodiments of the present access node are mentioned in the appended claims.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein the single FIGURE represents a flow-aware Ethernet access node 1 according to the invention.

BRIEF DESCRIPTION OF THE DRAWINGS

The single FIGURE is an illustration of a flow-aware Ethernet access node.

DETAILED DESCRIPTION OF EXEMPLARY EMBODIMENTS OF THE INVENTION

The access node 1 shown in the FIGURE is able to transmit Ethernet data frames between subscribers 2 and an aggregation network 3. It is preferably an Ethernet Digital Subscriber Line Access Multiplexer DSLAM provided with Asynchronous Transfer Mode ATM-like features that allows it to support a multi-service architecture. One of these ATM-like features is for instance "flow awareness", which is the ability to treat traffic differently depending on the subscriber to whom it belongs and the type of service it represents.

To achieve this, the access node 1, which will thus preferably be a Flow-Aware Ethernet DSLAM, comprises a first memory 4 storing classification rules applicable to the Ethernet data frames, and a classification agent 5 applying these rules onto source information extracted from incoming data frames. The aim of the classification agent 5 is to infer flow awareness information of outgoing frames corresponding to incoming data frames. The memory 4 is coupled to the classification agent 5 that is itself coupled to both the subscribers 2 and the aggregation network 3.

In a preferred embodiment, the classification agent 5 of the access node 1 applies the classification rules of the memory 4 only onto source information extracted from one or more first incoming data frames of a flow, also called pilot frames. This source information is inspected in detail, based on the set of the formal classification rules, in order to make a global policing, classification, and forwarding decision for the entire flow. The classification agent 5 further calculates frame signatures from source information extracted from the following data frame of the same flow. Recognized by their signature to belong to the same flow, these later frames are treated according to the decision established for the pilot frames. This concept is called "stateful flow awareness".

It is to be noted that the source information extracted from the Ethernet data frames consists in at least one or a combination of:
 a source Media Access Control MAC address,
 a destination Media Access Control MAC address,
 a Virtual Local Area Network Identification Number VLAN ID,
 a user-priority field, a source Internet Protocol IP address,
 a destination IP address, and/or
 a Type Of Service TOS field.

Physical port, logical port (if applicable), source and/or destination MAC address, VLAN id, 802.1 p bits, source and/or destination IP address, TOS bits are all fields of the protocol stack up to layer 3.

In other words, the decision to forward a flow to a particular outbound port may be based, among other criteria, on its destination MAC address (Ethernet bridging), the VLAN identifier and destination MAC address (VLAN bridging), or the destination IP address (basic IP router function).

The access node 1 also comprises a second memory 6 coupled to the classification agent 5 and storing flow rules applicable to the signatures of the data frames. The classification agent 5 applies the flow rules onto frame signatures in order to infer flow awareness information of outgoing frames corresponding to incoming data frames.

Furthermore, the access node 1 also comprises a service agent 7 coupled in a bidirectional way to the classification agent 5 and able to extract additional information from the incoming data frames.

As for the classification agent 5, the service agent 7 applies the classification rules of the first memory 4 but now to a combination of the above source information and of the additional information. The aim of the service agent 7 is to infer flow awareness information of outgoing frames corresponding to incoming data frames. It can be seen that the flow may be committed to a "service blade" or an internal agent that is capable of treating the individual frames of the flow with regard to higher-layer content information, i.e. the additional information.

The additional information consists in at least one or a combination of:
 an Internet Protocol IP field,
 a source Transmission Control Protocol TCP port,
 a destination TCP port,
 a source User Datagram Protocol UDP port, and/or
 a destination UDP port.

This further granularity is obtained by looking at fields from layer 4 of the protocol stacks up.

The above-mentioned flow awareness information consists in one or more of outbound port identity, format, header fields, priority, and drop precedence of an outgoing frame corresponding to the incoming data frame.

Flow awareness allows a dynamic increase or decrease of the number of quality-of-service levels at the flow-aware Ethernet DSLAM. Another advantage is the possibility to apply additional processing to certain flows, including network address translation and encryption. To this end, the service agent 7 may be adapted to apply cryptographic transformations to at least parts of the incoming data frames.

It to be noted that flow classification does not require a match of all the fields that the classification agent 5 is able to inspect; certain fields or certain rules may be treated as "wildcards", which means that their value does not influence the identification of the frame as belonging to a particular flow.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is merely made by way of example and not as a limitation on the scope of the invention, as defined in the appended claims.

The invention claimed is:

1. An access node (1) configured to transmit Ethernet data frames between a plurality of subscribers (2) and an aggregation network (3),
    wherein said access node (1) comprises a memory (4) configured to store classification rules applicable to said data frames,
    said access node further comprises a classification agent (5) coupled to said memory and configured to extract source information from an incoming data frame, and to apply said classification rules onto said extracted source information in order to infer flow awareness information of an outgoing frame corresponding to said incoming data frame; and
    said classification agent (5) is further configured to calculate frame signatures of said incoming data frames from said extracted source information,
    wherein said access node (1) further comprises a second memory (6) coupled to said classification agent and configured to store flow rules applicable to said signatures, and
    wherein said classification agent is configured to apply said flow rules onto said frame signatures in order to infer said flow awareness information of an outgoing frame corresponding to said incoming data frames.

2. The access node according to claim 1, characterized in that said access node (1) is an Ethernet Digital Subscriber Line Access Multiplexer (DSLAM).

3. The access node according to claim 1, characterized in that said classification agent (5) is configured to apply said classification rules onto first source information extracted from at least one first incoming data frame of a flow, and to calculate frame signatures from second source information extracted from the following data frame of said flow.

4. The access node according to claim 1, characterized in that said source information comprises one or more of a source Media Access Control MAC address, a destination Media Access Control MAC address, a Virtual Local Area Network Identification Number VLAN ID, a user-priority field, a source Internet Protocol IP address, a destination IP address, and a Type Of Service TOS field.

5. The access node according to claim 4,
    characterized in that said access node (1) further comprises a service agent (7) coupled to said classification agent (5) and configured to extract additional information from said incoming data frames
    and in that said service agent is configured to apply said classification rules to a combination of said source information and said additional information in order to infer flow awareness information of an outgoing frame corresponding to said incoming data frame.

6. The access node according to claim 5, characterized in that said additional information comprises one or more of an Internet Protocol IP field, a source Transmission Control Protocol TCP port, a destination TCP port, a source User Datagram Protocol UDP port, and a destination UDP port.

7. The access node according to claim 1, characterized in and in that said flow awareness information comprises one or more of outbound port identity, format, header fields, priority, and drop precedence of an outgoing frame corresponding to said incoming data frame.

8. The access node according to claim 1, characterized in that said access node (1) further comprises a service agent (7) coupled to said classification agent (5) and configured to apply cryptographic transformations to at least parts of said incoming data frames.

* * * * *

UNITED STATES PATENT AND TRADEMARK OFFICE
CERTIFICATE OF CORRECTION

PATENT NO. : 7,599,366 B2
APPLICATION NO. : 11/265247
DATED : October 6, 2009
INVENTOR(S) : Beck et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 844 days.

Signed and Sealed this

Twenty-eighth Day of September, 2010

David J. Kappos
*Director of the United States Patent and Trademark Office*